Feb. 18, 1930.　　　L. G. HAASE　　　1,747,708
MOLDING MACHINE
Filed July 20, 1927　　2 Sheets-Sheet 1

INVENTOR
LEO. G. HAASE
BY Hazard and Miller
ATTORNEYS

Feb. 18, 1930.    L. G. HAASE    1,747,708
MOLDING MACHINE
Filed July 20, 1927    2 Sheets-Sheet 2
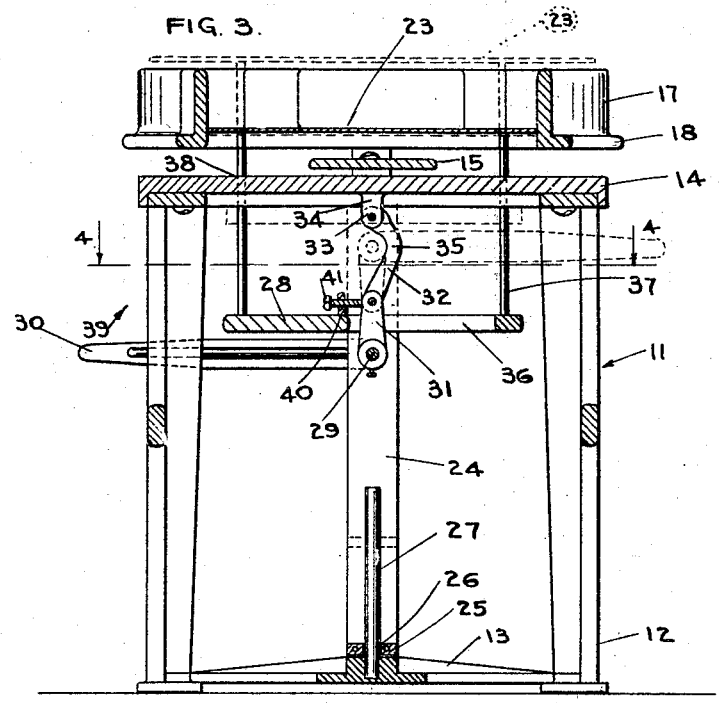
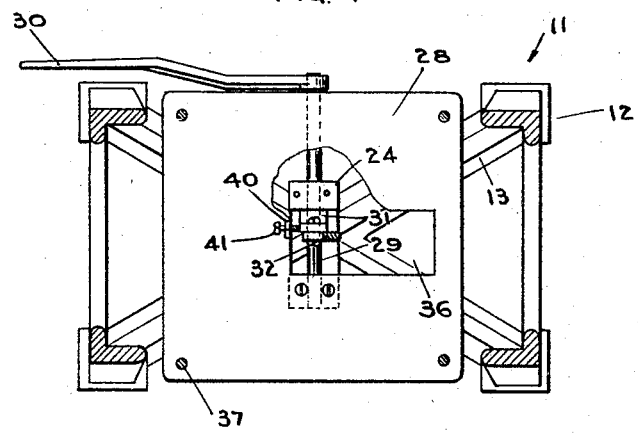
INVENTOR
LEO G. HAASE
By Hazard and Miller
ATTORNEYS Patented Feb. 18, 1930

1,747,708

UNITED STATES PATENT OFFICE

LEO G. HAASE, OF LONG BEACH, CALIFORNIA

MOLDING MACHINE

Application filed July 20, 1927. Serial No. 207,141.

My invention is a molding machine, its particular adaptation being for molding ends of concrete benches.

An object of my invention is a molding machine for concrete block molding, in which the particular adaptation is for forming integral blocks with a number of recesses therein which may be utilized as ends for concrete benches.

Considered broadly, an object of my invention is an open top molding machine in which a pallet rests at the base of a mold and after forming and partial setting of the concrete in the mold, the pallet is elevated, lifting the molded block out of the mold, whence the block and the pallet may be removed and the block allowed to harden and set on the pallet.

A further feature of the invention is having a mold mounted on a table with a pallet fitting in the mold and having a plurality of vertically movable rods which engage the pallet and elevate it out of the mold. The movement of the rods is controlled by a lever which is mounted on a lifting table from which the rods extend upwardly, this lever, through the medium of a rock shaft, being connected by draw links to the under side of the mold table; hence, on operating the lever to discharge the pallet and block, the rock shaft and lever rise upwardly with the lifting table.

In constructing my invention as applied to end frames for concrete benches, I construct a frame with a suitable table top, and above this frame I position a mold which is preferably open at the bottom. There are a series of cores which extend upwardly from the table and pass through openings in a pallet. The pallet fits in a mold rising from the table and is engaged by a plurality of rods which extend upward through the table and are connected to a lifting table. This latter has a rock shaft connected thereto, with a lever, and this rock shaft is connected by a pair of links to the under surface of the mold table. In order to form a limit to the downward movement of the lifting table, legs extend downwardly to the bottom of the frame.

My invention will be more readily understood from the following description and drawings, in which:

Figure 3 is a vertical transverse section on the line 3—3 of Fig. 2 in the direction of the arrows.

Figure 4 is a horizontal section on the line 4—4 of Fig. 3 in the direction of the arrows.

Figure 1:
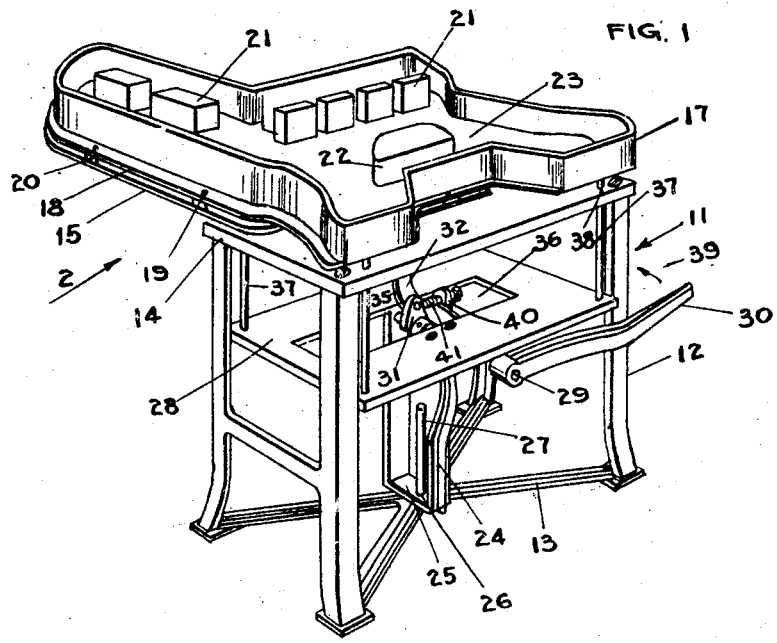
Figure 1 is a perspective view of the molding machine.
Figure 2:
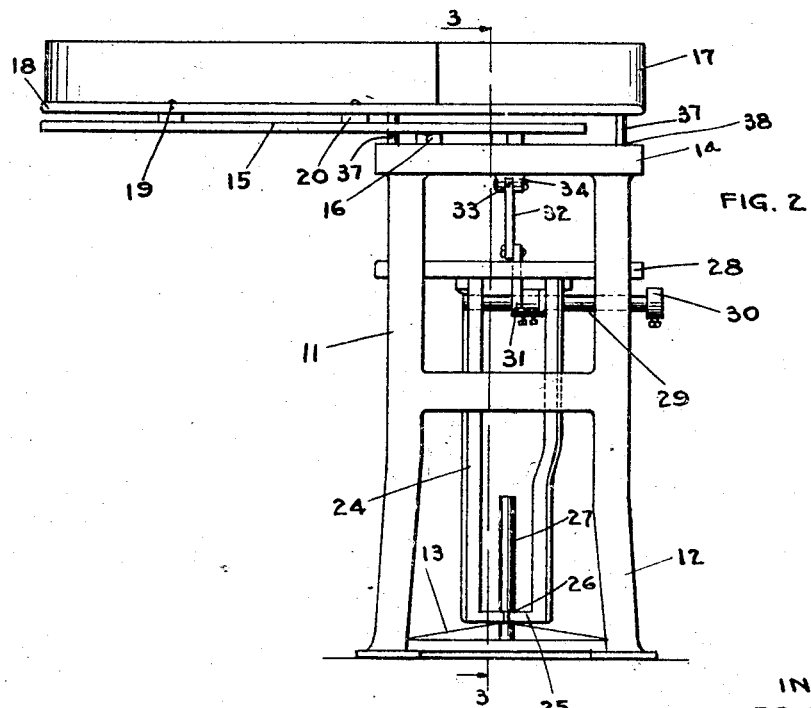
Figure 2 is a side elevation taken in the direction of the arrow 2 of Fig. 1.

The main structure of my invention comprises a frame 11 with suitable legs 12 and cross braces 13 at the bottom, and on this frame there is mounted a mold table 14 at the top. This mold table is for general use and may be adapted to different types of molds which may be mounted thereon. In the present instance I have an upper mold table 15 which is mounted on the table 14 and held thereon by bolts 16 or the like and spacing nuts or blocks. Above the upper mold table there is supported a mold 17. This mold is indicated as provided with a flange 18, by means of which bolts 19 secured to the flange and the upper table 15 support the mold proper above such upper table, there being spacing blocks 20 to secure the proper spacing.

The upper table 15 has a series of cores or lugs 21 secured thereto in the desired spaced relations, and these are designed to pass through openings 22 in a pallet 23. The pallet fits inside the mold, being of the proper contour to give a sliding fit in the mold. The concrete block to be formed is molded on the pallet.

A pair of legs 24 having a foot 25 at the bottom with an opening 26 therethrough are slidable on a vertical post 27 supported from the cross brace 13. On the top of these legs there is secured a horizontal lifting table or plate 28. A rock shaft 29 is journaled underneath the lifting table, preferably by journals extending through the legs 24, and an operating handle 30 is connected to the outer end of this rock shaft. A crank 31 is connected to the rock shaft and engages a link 32 which is pivotally connected at its upper end 33 to lugs 34 depending from the table 14. This link has a curved section 35 to loop or bend around the rock shaft, as herein indicated. This lifting table has a cut-out section 36 to allow operation of the crank 31 and the link 32. Extending upwardly from the lifting table there are a series of rods 37 which pass through apertures 38 in the table 14 and engage the lower surface of the pallet 23.

The manner of functioning and operation of my molding machine is substantially as follows:

With the machine in the position shown in Fig. 1 the pallet is in its lowermost position and concrete or the like may be filled in in the mold, using the pallet as a base, until the desired thickness is obtained. The mold is usually filled to the top. This imbeds the cores 21 which may either extend completely through the block being molded, or partly through, and if desired, re-enforcing wires may be placed in the mold while putting the concrete therein. As soon as desired the operating lever is given an upward movement in the direction of the arrows 39, rocking this over to the other side. Such action rocks the rock shaft 29 causing the crank 31 to pull downwardly on the link 32, and as this link is secured to the fixed table 14, the lifting table 28 is elevated, carrying the rock shaft with it. This elevating movement forces the rods 37 upwardly and as these also pass through apertures in the upper table 15, they engage the under surface of the pallet and thrust the pallet with the block thereon upwardly above the top of the mold. This action shifts the various parts of the machine from the positions illustrated in Fig. 1 to those illustrated dotted in Fig. 3. When the pallet is thus projected above the top of the mold it may be lifted off the mold and the block and pallet conveyed to suitable location for drying and setting of the concrete. Another pallet may then be placed on top the rods and lowered into position by the reverse operation.

It will be noted that when the crank 31 is in the reverse position, as shown in full lines and dotted lines in Fig. 3, that is, when the lifting table is elevated, the link 32 fits around the rock shaft, hence it is desirable to have a bend 35 in this link. This, however, depends on the relative length of the crank 31 and the relative position of the rock shaft 29 and if a complete reversal of the crank is not necessary to elevate the pallet to sufficient height, the link 32 may be straight.

While I have illustrated a mold suitable for making the end frames for concrete benches, it is to be understood that the particular design of mold may be for any suitable blocks which may be formed of hand tamped concrete or the like. It is, however, desirable to have an upper mold table 15 spaced from a table 14 proper, as this allows for a multiplicity of different types of molds to be used on the same frame and table. Other applications of my invention will be apparent from the above description.

In order to form an adjusting stop to locate the rods in the proper withdrawn relation to the pallet and to bring the operator's handle always at the same height from the floor, I provide a lug 40 on the table 28, and through this mount an adjusting screw 41. This screw engages the crank 31 and prevents its further rotation, thus forming a limit to the movement. In the adjustment shown the stop engages the crank when it is vertical, as shown in full lines in Figs. 1 and 3. A feature of my invention in having the fixed table 14 and the upper mold table 15 positioned thereabove and spaced from the table 14 is that this readily allows the attachment of an upper table which conforms more or less to the shape of the particular mold which is attached to the main structure and if the table 14 should be out of level, the spacing of the two tables apart allows the upper table 15 to be properly leveled. Moreover, this construction of spacing these tables allows any dirt to be readily cleared from between such tables.

An object in having the mold 17 positioned above the mold table 15 is that this allows any dirt or particles of concrete which may work their way between the pallet 23 and the mold 17 or the cores 21 to readily fall clear of the mold and the pallet, so that the pallet may be drawn down to its full distance for refilling the mold. This construction also allows any dirt or particles of concrete to be readily cleared off of the upper mold table 15 and the main table top 14.

An important feature of my invention is the ease of operation of the device in ejecting the molded articles formed on the platten. When the cast article is ready to expel the operating handle 30 occupies a low position as indicated in Fig. 3 and when the operator pulls upwardly on this, he, to a certain extent gives an actual lifting of the lifting table 28 which is pivotally connecting to this table 28 by the rock shaft 29. At the same time the crank 31 connected to the rock shaft exerts a pull on the link 32, causing the lifting table 28 to be elevated as the operator pulls upwardly on the operating lever 30. The operator thus obtains a considerable lever in lifting and elevating the lifting table 28 and hence the platten 23 with the molded article thereon, this latter being elevated through the medium of the series of rods 37.

When the molded article is in its highest position the operating handle 30 occupies the dotted line position of Fig. 3. This is a high position relative to the workman but when he requires to lower the platten very little strength is required, as merely tilting this handle up from its high position causes it to swing over the platten 23 and the lifting table 28 being lowered, the action of gravity aids this movement.

Various changes may be made in the principles of my invention without departing from the spirit thereof, as set forth in the description, drawings and claims.

I claim:

1. A molding machine comprising in combination a mold table, a mold supported thereby, a pallet fitted in the mold, a lifting table below the mold table having a plurality of rods extending upwardly through the table and engaging the pallet, a rock shaft mounted on the lifting table, means to operate said shaft, and means interconnecting the shaft and the table to elevate the lifting table and the rods, thus lifting the pallet above the mold.

2. A molding machine comprising in combination a frame having a mold table on the top, a mold supported above the table, a pallet fitting in the mold, a lifting table, a plurality of rods secured thereto and extending upwardly through the mold table and engaging the pallet, a rock shaft having an operating handle connected to the lifting table, said table having an opening, a crank on the said shaft, a link interconnecting the crank and the mold table, whereby on operation of the handle the lifting table is elevated and the rods elevate the pallet above the mold.

3. A molding machine comprising in combination a frame having a mold table thereon, an upper mold table positioned thereabove, a mold secured above the upper mold table, a pallet fitting in the mold, a lifting table, a plurality of rods secured to said table and extending upwardly through the mold table and the upper table and engaging the pallet, a rock shaft mounted on the lifting table and having an operating handle, said lifting table having a central opening with a crank operable therein secured to the rock shaft, interconnecting the crank and the mold table, and on operation of the handle the lifting table being drawn upwardly and the rods lifting the pallet above the mold.

4. A molding machine comprising in combination a frame having a mold table, an upper mold table secured thereto, a mold positioned above the upper mold table and the mold table, the upper mold table having a plurality of cores, a pallet fitting in the mold having openings through which the cores may pass, a lifting table, a plurality of rods secured thereto and extending upwardly through the mold table and the upper table and engaging the pallet, a rock shaft journaled in the lifting table, and means interconnecting said shaft and the mold table to elevate the lifting table, the said rods lifting the pallet above the mold.

5. In a molding machine, a frame having a mold table, said table being adapted for attachment of molds, a structure below the mold table having a plurality of rods extending upwardly through said table, a rock shaft on the said structure, and means interconnecting said shaft and the table to elevate the structure on operation of the shaft and lift the rods whereby an article molded may be lifted out of the mold secured to the table.

6. In a molding machine, a frame having a mold table, a lifting table having a plurality of rods extending upwardly through the mold table, a rock shaft on the lifting table having a crank, a link interconnecting the crank and the mold table, whereby on operation of the rock shaft the lifting table is elevated and the rods moved upwardly, said rods being adapted to lift an article molded in a mold supported on the mold table.

7. In a molding machine, a frame having a mold table, a lifting table having a plurality of rods extending upwardly through the mold table, a rock shaft on the lifting table having a crank, a link interconnecting the crank and the mold table, whereby on operation of the rock shaft the lifting table is elevated and the rods moved upwardly, said rods being adapted to lift an article molded in a mold supported on the mold table, and a stop on the lifting table comprising a lug and an adjusting screw threaded therethrough, said screw being adapted to engage the crank.

8. In a molding machine, the combination of a fixed structure on which a mold may be placed, a vertically movable structure having means to eject a molded article from the mold, a rock shaft pivotally mounted on the movable structure and having an operating handle connected thereto, and means interconnecting said shaft and the fixed structure to elevate the movable structure on the shifting of the operating handle from one position to another.

9. In a molding machine, the combination of a fixed structure adapted to support a mold, a movable structure having means to eject an article made in the mold, a crankshaft having a crank rotatably mounted on the movable structure and having an operating handle and means interconnecting the fixed structure and the crank, whereby on shifting of the operating handle in an arcuate movement the said movable structure is elevated and causes the ejection of the molded article.

10. In a molding machine, the combination of a fixed structure adapted to support a mold, a lifting structure vertically movable in the fixed structure and having means to eject an article from the mold, a rock shaft journaled in the lifting structure and having a handle lever connected thereto, a crank connected to said shaft and a link connecting the crank and the said fixed structure, whereby on operation of the handle in an arcuate movement the crank and link cause the elevation of the lifting structure and hence eject the article molded.

11. In a molding machine, the combination of a fixed structure having means to support a mold, a lifting table having an opening and ejecting means passing therethrough, said structure being adapted to eject a molded article from the mold, a rock shaft mounted on said lifting table having a crank operating in the said opening, a link connecting the crank and the fixed structure and a handle lever connected to the crank shaft and extending substantially horizontally therefrom when the lifting table is in its lowermost position, the tilting upwardly of said handle lever causing the raising of the lifting table and hence the ejection of the article.

In testimony whereof I have signed my name to this specification.

LEO G. HAASE.